Patented Dec. 24, 1940

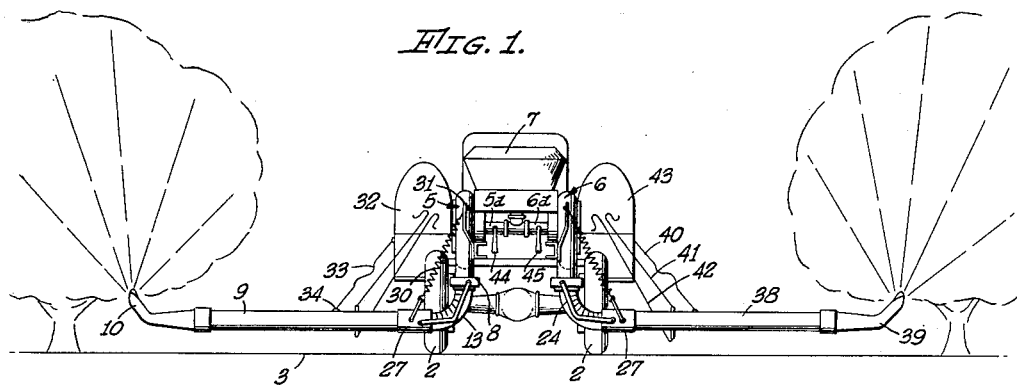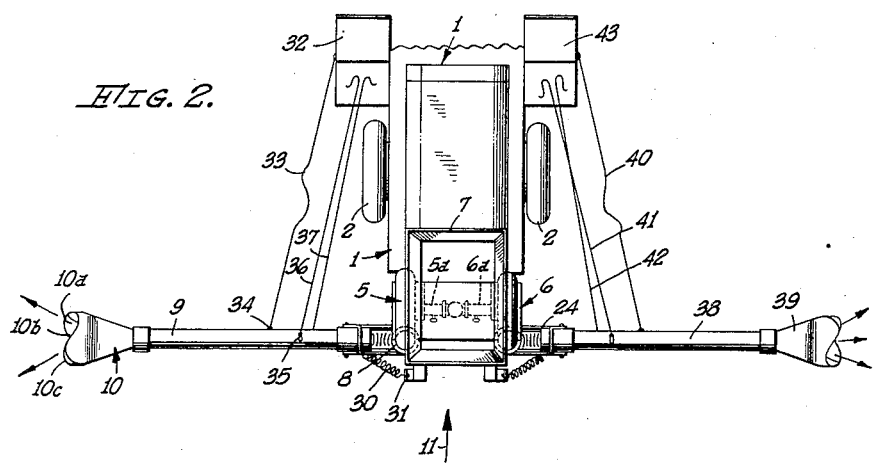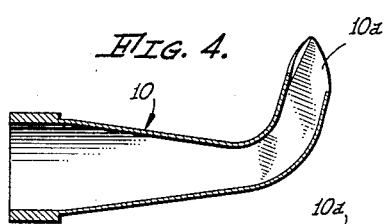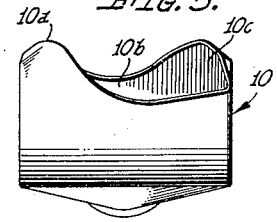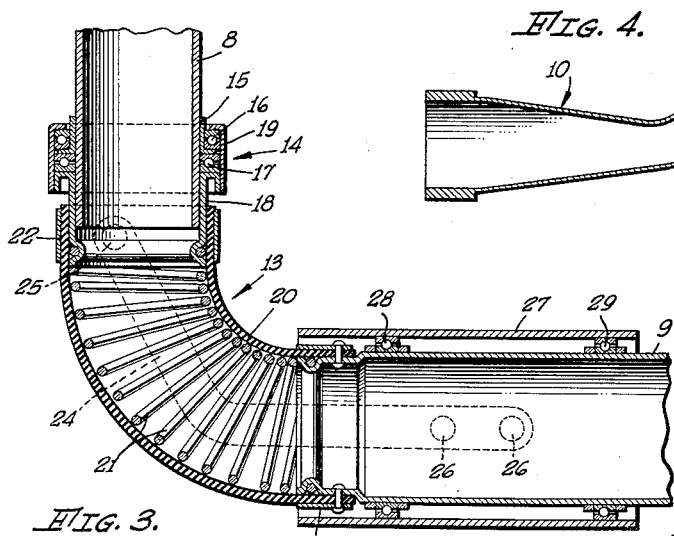
Dec. 24, 1940.     D. PARKER     2,226,136
DUST APPLYING MACHINE
Filed July 17, 1939
INVENTOR.
DONALD PARKER
ATTORNEY.

2,226,136

UNITED STATES PATENT OFFICE 2,226,136

DUST APPLYING MACHINE

Donald Parker, Fresno, Calif.

Application July 17, 1939, Serial No. 284,882

8 Claims. (Cl. 43—148)

My invention relates to dust applying machines and has particular reference to an apparatus adapted for dusting or "dry spraying" of fruit trees, vines and the like with insecticide or fungicide in the form of dry dusts.

It has recently been discovered that a number of the insect pests which attack and injure citrus trees, walnut trees, avocado trees and other fruit bearing trees can be readily controlled by the application, to the trees and their fruits, of sulphur in the form of an extremely fine dust, application of the dust being most effective if a thorough distribution thereof is made through the foliage and fruit of a tree without applying an excess of the dust upon certain parts of the tree, particularly parts which are exposed to the effects of the direct rays of the sun. It has therefore been attempted to apply this dust by entraining the same in a blast of air which is directed upwardly from beneath the overhanging branches of the tree.

The apparatus which has heretofore been employed for this purpose comprises a carriage device which may be moved along the space between adjacent rows of trees and carries a dust bin from which the sulphur dust may be fed into a blast of air from a blower mounted on the carriage, the air and dust blast being conducted by a conduit to an applicator nozzle disposed at the end of the conduit and arranged sufficiently close to the ground surface as to permit its insertion beneath the overhanging branches of the trees. Such apparatus requires the passage of the carriage along the row for each line of trees.

It is therefore an object of my invention to provide a dust applicator in which two adjacent rows of trees may be dusted at one time and in which the application of dust to each of the rows may be individually controlled and regulated.

Another object of my invention is to provide a conduit and nozzle arrangement which will permit of regulation of the nozzle in any desired position beneath each tree so as to permit the operator of the machine to arrange the application of dust to any selected tree in accordance with the peculiarities of shape and contour of the tree.

Another object of my invention is to provide a conduit arrangement of the character set forth in the preceding paragraph wherein movement of the conduit and carriage relative to each other in disposing the nozzles beneath the individual trees and individually regulating the nozzles for each tree may be readily accomplished without destruction or injury to the conduit.

Other objects and advantages of my invention will be apparent from a study of the following specification, read in connection with the accompanying drawing, wherein Fig. 1 is an end elevational view of a dust applicator constructed in accordance with my invention;

Fig. 2 is a top plan view of the machine illustrated in Fig. 1 and illustrating the manner in which the nozzles and conduits may be controlled;

Fig. 3 is a detailed sectional view through a portion of the conduits illustrated in Figs. 1 and 2, showing the manner in which the conduits may be jointed to permit ready movement between the conduits and the carriage;

Fig. 4 is a vertical sectional view of one form of nozzle particularly adapted for the practice of my invention; and Fig. 5 is an end elevation of one of the nozzle outlets.

Referring to the drawing, I have illustrated in Figs. 1 and 2 an applicator constructed in accordance with my invention as comprising a suitable carriage 1 which may be constructed as a modified form of truck including wheels 2 by which the carriage may be moved over the ground surface 3 through the orchard or grove to be treated. The carriage 1 supports a suitable source of power (not shown) which may be an internal combustion engine or other self-contained prime mover. The power source or engine is suitably coupled to a pair of blowers or fans 5 and 6, each of which has an inlet 5a and 6a, respectively, communicating with a dust bin 7 which contains a supply of finely divided sulphur or other insecticide or fungicide which is to be applied to the trees.

Leading from the blower 5 and extending downwardly is a pipe 8 by which the blast of dust and air from the blower 5 may be passed to a conduit 9, the outer end of which is provided with a nozzle 10, adapted to be disposed beneath the trees to be treated.

As illustrated in Figs. 1 and 2, in order to dispose the nozzle 10 beneath the overhanging and low hanging branches of the trees to be treated, the conduit 9 is arranged to be carried in a horizontal position immediately above and closely adjacent to the surface of the ground 3, thereby permitting the nozzle to be readily swung into position beneath the tree without interference with such branches.

I prefer to support the conduit 9 upon the carriage 1 in such fashion that as the carriage advances in the direction of the arrow indicated at 11 in Fig. 2, the conduit may be pivotally moved from a position disposing the nozzle 10 beneath a tree in advance of the then position of the carriage to maintain the nozzle beneath that tree until the advancing movement of the carriage places the carriage in a position considerably in advance of that tree.

To permit the conduit 9 to be swung forwardly and rearwardly of the carriage for the purpose hereinbefore described, I connect the inner end thereof to the pipe 8 by means of an elbow 13 and provide a rotary joint 14 between the downwardly extending end of the elbow. This joint 14 is so constructed that the conduit 9 may be swung repeatedly in a horizontal plane without imposing any strain or twist to the conduit or its connecting pipe 8.

One form of rotary joint which will serve this purpose is illustrated in Fig. 3 as being formed by suitably securing a band 15 having an angular cross section to the lower end of the pipe 8 so as to provide an annular ledge upon which a ball thrust bearing 16 may rest. Below the band 15 is placed another ball thrust bearing 17 adapted to bear against the underside of the band 15 and not upon the upper end of a flanged nipple 18 secured into the upstanding end of the elbow 13. The bearing 17 thus operates to prevent upward movement of the elbow 13 relative to the pipe 8 while permitting rotation about the axis of this pipe. The bearing 16 may be similarly employed to prevent downward movement of the elbow 13 by providing a collar 19 having an angle cross section defining a flange which rests upon the upper surface of the bearing 16 and which is secured at its lower edge to the upper end of the nipple 18.

In view of the fact that this construction permits the outer end of the conduit 9 to be disposed beneath a tree in advance of the position of the carriage and then rotated beneath the tree as the carriage advances, the nozzle 10 is preferably constructed to produce a substantially fan-shaped blast of air and dust, the plane of the fan being transverse to the longitudinal axis of the conduit 9. Thus the fan-shaped blast of air and dust will be rotated through a considerable portion of a revolution as the carriage advances and will so extend the area of the dust blast as to cause a substantially even distribution of the dust throughout the entire tree.

However, due to the fact that the total angle through which the conduit 9 may be moved between its position in advance of the carriage and its position to the rear of the carriage while the nozzle is disposed beneath any particular tree, is relatively limited, the efficiency of the applicator and the even and complete distribution of the dust throughout the trees may be greatly increased by arranging the nozzle 10 as shown in Figs. 2, 4 and 5 so that while the plane of the fan shape of the nozzle is disposed transversely of the longitudinal axis of the conduit 9, the nozzle is adapted to distribute the dust rather widely in the direction of the length of the conduit 9 so that when the conduit is in its normal position, as illustrated in Fig. 2, a part of the dust is blown upwardly and outwardly from the nozzle, a part vertically and another part upwardly and inwardly.

This distribution of the dust laden air discharged from the nozzle 10 may be readily obtained by providing a discharge passage having a twisted shape so that a forward portion 10*a* is directed upwardly at a steep angle, a central portion 10*b* is directed upwardly and outwardly at a lesser angle and a rear portion 10*c* is directed upwardly and outwardly at a relatively small angle to the horizontal. This construction also imparts a spinning motion to the blast of air and dust as it is discharged so as to further distribute the dust uniformly throughout the branches of the tree.

It frequently occurs that in treating a grove or orchard, certain of the trees will not be symmetrical in shape so that the mere disposition of the nozzle end of the conduit 9 beneath the tree and the rotation thereof in a horizontal plane by the forward movement of the carriage 1 will not sufficiently distribute the dust throughout all portions of such non-symmetrical trees. I have therefore provided for rotation of the conduit 9 about its longitudinal axis so as to permit the fan-shaped blasts of air and dust from the nozzle 10 to be directed differently under different trees which are to be treated, dependent upon the judgment of an operator of the machine as to how the blast should be most effectively directed against that particular tree. For this purpose I prefer to make the elbow flexible as by reinforcing a rubber or similar flexible hose-like material 20 by means of a helically wound internal spring 21. The upper end of the hose 20 and spring 21 may be secured to the nipple 18 by means of a clamp band 22. In a similar manner, the horizontally disposed end of the elbow 13 may be secured to the inner end of the conduit 9 by means of a clamp band 23.

I employ a pair of elbow type diagonal braces 24 pivotally secured as at 25 to opposite sides of the nipple 18 and fixedly secured as at 26 to opposite sides of a conduit carrier 27 for holding the elbow 13 in its approximate arcuate form while permitting it to flex and twist. The conduit carrier 27 preferably comprises a sleeve encircling the conduit 9 and supporting the conduit for axial rotation upon suitable bearings 28 and 29 interposed between the sleeve and the conduit.

It will be observed that the elbow construction described permits not only rotation of the conduit 9 about the vertical axis of the pipe 8 but also about its own axis as well as permitting the nozzle 10 to move vertically to pass obstructions encountered as it is moved along the ground surface.

The end of the conduit 9 and the nozzle 10 secured thereto are preferably held clear of the ground surface by means of a tension spring 30 secured to the conduit carrier 27 and extending rearwardly and upwardly to a point of attachment 31 on the frame 1. This disposition of the spring 30 tends not only to hold the nozzle 10 clear of the ground surface 3 but operates also to swing the conduit 9 in a horizontal plane to dispose the nozzle 10 in its most rearward position relative to the carriage or frame 1.

In order to permit an operator of the machine to readily control the rotation of the conduit 9 and the correct disposition of the nozzle 10 beneath a particular tree, I provide upon the carriage 1 a seat or platform 32 upon which the operator may ride and extend to this seat control devices which will permit this operator while riding the machine to correctly dispose the nozzle beneath the trees.

One of these control devices comprises a rope, cable or other "pull" member 33, one end of which is connected to the conduit 9 as indicated at 34 at some point along the length of the conduit 9 disposed a considerable distance from the elbow 13. Thus when the operator draws in upon the pull member 33, the conduit 9 will be swung forwardly of the then position of the carriage against the returning urge of the spring 30 to dispose the nozzle 10 beneath the next tree to be approached by the carriage. Then by gradually releasing the pull member 33, the forward movement of the carriage and the rearward pull of the spring 30 will result in the pivoting or rotating of the conduit 9 in a horizontal plane with the nozzle 10 disposed below that tree.

In order to permit the operator to readily control the rotation of the conduit 9 about its horizontal axis, I provide a bridle 35 upon the conduit 9 which may comprise a pair of outwardly extending arms disposed upon opposite sides of the conduit 9 and extending transversely of the longitudinal axis thereof, to the outer ends of which I connect a pair of reins 36 and 37 which extend to the operator's seat 32. Thus by drawing upon one or the other of the reins 36 or 37, the nozzle 10 may be disposed in any desired angular relation to the ground surface.

To permit the most effective treatment of the trees with a minimum consumption of time, I provide a second conduit 38 upon the opposite side of the carriage 1 which is coupled to the blower 6 and is provided with a nozzle 39 duplicating the arrangement of the nozzle 10. A duplicate set of control devices 40, 41 and 42 is provided on this conduit extending to a seat or platform 43 upon which a second operator may ride who will control the disposition of the conduit 38 and its associated nozzle for the row of trees next adjacent to those being treated with the conduit 9.

With this form of device the carriage 1 is driven once down alternate rows between adjacent lines of trees, the trees in both rows being simultaneously treated by the blasts of dust directed upwardly beneath the trees from the nozzles 10 and 39. Thus, the carriage is drawn down the next alternate row so that two rows of trees will be dusted upon each passage of the machine. By repeating this process throughout the orchard or grove, a complete dusting of all the trees may be readily accomplished.

Since each of the conduits 9 and 38 is independently controlled by independent operators, I prefer to provide valves 44 and 45 associated with the blowers 5 and 6, respectively, so that throughout the operation the operator controlling the conduit 9 may at all times control the quantity of dust which is to be injected into the blast of air from the conduit 9 while similarly the operator controlling the movements of the conduit 38 may independently control the quantity of dust passed to that conduit.

While I have shown and described the preferred embodiment of my invention, I do not desire to be limited to any of the details of construction shown or described therein, except as defined in the appended claims.

I claim:

1. In a dust applicator for dusting or dry spraying trees with insecticide or fungicide dust, a means on said carriage for producing a blast of air mixed with said dust, an elongated conduit, means suspending said conduit from said carriage to extend horizontally therefrom at substantially ground level, means coupling said conduit to said blast-producing means including a rotary joint between said conduit and said carriage to permit movement of said conduit in a horizontal plane without imposing strains upon said conduit, and coupling means coupling said conduit to said carriage for rotary movement about the longitudinal axis of said conduit.

2. In a dust applicator for dusting or dry spraying trees with insecticide or fungicide dust, a carriage, means on said carriage for producing a blast of air mixed with said dust, an elongated conduit, means suspending said conduit from said carriage for movement with said carriage in a position substantially parallel to and immediately adjacent to the surface of the ground, a nozzle communicating with the outer end of said conduit through which the blast of air and dust may pass, said nozzle being directed at substantially right angles to the longitudinal axis of said conduit, and coupling means interposed between said conduit and said carriage for mounting said conduit for rotary movement about the longitudinal axis of said conduit to direct said nozzle at different angles relative to the ground surface.

3. In a dust applicator for dusting or dry spraying trees with insecticide or fungicide dust, a carriage, means on said carriage for producing a blast of air mixed with said dust, an elongated conduit, means suspending said conduit from said carriage for movement with said carriage in a position substantially parallel to and immediately adjacent to the surface of the ground, a nozzle communicating with the outer end of said conduit through which the blast of air and dust may pass, said nozzle being directed at substantially right angles to the longitudinal axis of said conduit, and coupling means interposed between said conduit and said carriage for mounting said conduit for rotary movement about the longitudinal axis of said conduit to direct said nozzle at different angles relative to the ground surface, said coupling means comprising a flexible joint in said conduit.

4. In a dust applicator for dusting or dry spraying trees with insecticide or fungicide dust, a carriage, means on said carriage for producing a blast of air mixed with said dust, an elongated conduit, means suspending said conduit from said carriage for movement with said carriage in a position substantially parallel to and immediately adjacent to the surface of the ground, a nozzle communicating with the outer end of said conduit through which the blast of air and dust may pass, said nozzle being directed at substantially right angles to the longitudinal axis of said conduit, and coupling means interposed between said conduit and said carriage for mounting said conduit for rotary movement about the longitudinal axis of said conduit to direct said nozzle at different angles relative to the ground surface, and control means extending from said conduit to said carriage for rotating said conduit about said longitudinal axis.

5. In a dust applicator for dusting or dry spraying trees with insecticide or fungicide dust, a carriage, means on said carriage for producing a blast of air mixed with said dust, an elongated conduit, means suspending said conduit from said carriage for movement with said carriage in a position substantially parallel to and immediately adjacent to the surface of the ground, a nozzle communicating with the outer end of said conduit through which the blast of air and dust may pass, said nozzle being directed at substantially right angles to the longitudinal axis of said conduit, coupling means interposed between said conduit and said carriage for mounting said conduit for rotary movement about the longitudinal axis of said conduit to direct said nozzle at different angles relative to the ground surface, a bridle on said conduit extending in a plane transverse to the longitudinal axis of said conduit, and a pair of reins extending from said bridle to said carriage for permitting control of the rotation of said conduit about said axis.

6. In a dust applicator including a means for producing a blast of air mixed with dust and a horizontally disposed conduit for conducting said blast to a point beneath a tree, a nozzle including means for attachment to said conduit; and means defining a discharge passage extending upwardly at an angle to the horizontal and terminating in a discharge orifice, said passage being twisted along its length so as to direct different portions of said blast at different angles to the horizontal.

7. In a dust applicator including a means for producing a blast of air mixed with dust and a horizontally disposed conduit for conducting said blast to a point beneath a tree, a nozzle including means for attachment to said conduit; a nozzle body defining a discharge passage of rectangular cross section extending upwardly at an angle to the horizontal and terminating in a rectangular discharge orifice, the length of said rectangular cross section increasing progressively away from said conduit to provide a fan-shaped blast from said orifice; and means disposing the plane of said orifice at an angle to the horizontal to direct different portions of said blast at different angles to the horizontal.

8. In a dust applicator including a means for producing a blast of air mixed with dust and a horizontally disposed conduit for conducting said blast to a point beneath a tree, a nozzle including means for attachment to said conduit; a nozzle body defining a discharge passage of rectangular cross section extending upwardly at an angle to the horizontal and terminating in a rectangular discharge orifice, the length of said rectangular cross section increasing progressively away from said conduit to provide a fan-shaped blast from said orifice; means maintaining said orifice in a position disposing the plane of said fan shape transversely of the length of said conduit; means on said body at said orifice for deflecting a part of said blast out of the plane of said fan shape in one direction; and means on said body at said orifice for deflecting another part of said blast out of the plane of said fan shape in the opposite direction.

DONALD PARKER.